July 26, 1932. J. A. WEILAND 1,869,232
MOLDING APPARATUS
Filed April 23, 1930 2 Sheets-Sheet 1
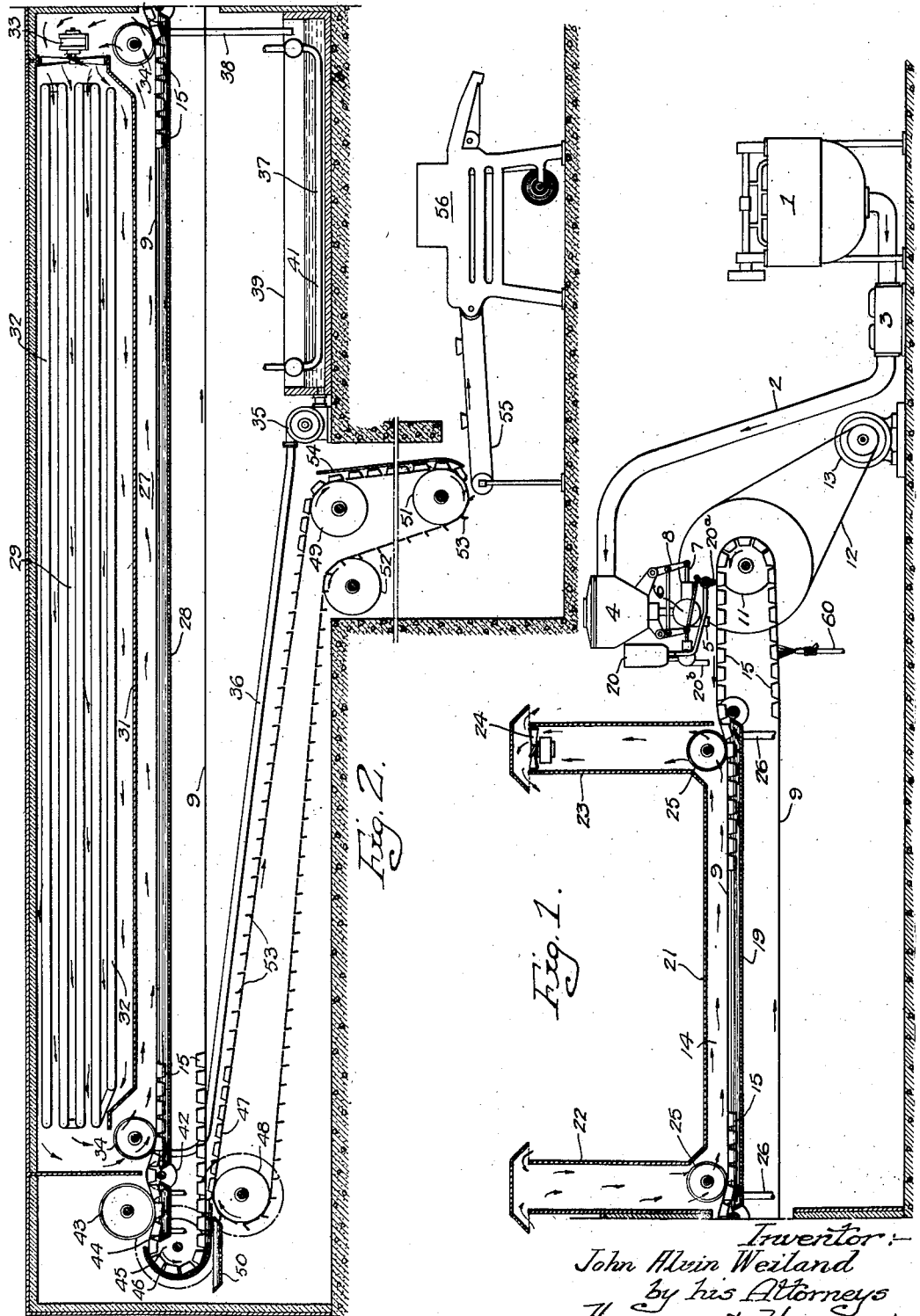
Inventor:—
John Alvin Weiland
by his Attorneys
Howson & Howson July 26, 1932.  J. A. WEILAND  1,869,232
MOLDING APPARATUS
Filed April 23, 1930   2 Sheets-Sheet 2

Inventor:—
John Alvin Weiland
by his Attorneys
Howson & Howson

Patented July 26, 1932

1,869,232

UNITED STATES PATENT OFFICE

JOHN ALVIN WEILAND, OF PHOENIXVILLE, PENNSYLVANIA, ASSIGNOR TO WEILAND PACKING COMPANY INC., OF PHOENIXVILLE, PENNSYLVANIA, A CORPORATION OF PENNSYLVANIA

MOLDING APPARATUS

Application filed April 23, 1930. Serial No. 446,574.

One object of this invention is to provide a machine for molding and packaging food products such as scrapple, corn meal mush, meat puddings and the like, the machine being calculated to eliminate hand work in the aforesaid operations.

More specifically, an object of the invention is to provide a machine which shall be capable of taking the material from the cooking vat or macerator, of dividing the mass into portions of predetermined weight, of molding these portions to the desired shape, of cooling the product where necessary, and finally of wrapping the molded portions, thereby delivering the product in condition for marketing.

The invention resides in the system as a whole and in individual mechanical details and arrangements hereinafter set forth and illustrated in the attached drawings, in which:

Figure 1 is a diagrammatic elevational view of a portion of a machine made in accordance with my invention;

Fig. 2 is a diagrammatic elevation view of the remaining part of the machine;

Figure 4:
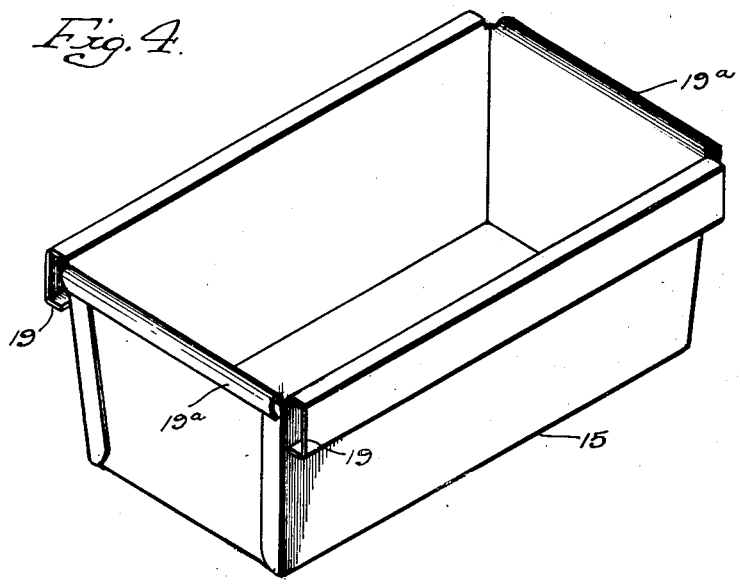
Fig. 4 is a view in perspective of one of the molding pans.

With reference to Fig. 1 of the drawings, reference numeral 1 indicates a cooking vat in which the product, which for the purpose of illustration we may assume is scrapple, is cooked. From the vat 1 the semi-fluid product is conducted through a pipe 2 and through the medium of a suitable pump 3 to a tank or hopper 4, which is provided with means for discharging through a nozzle 5 predetermined quantities of the material. In the operation of this measuring machine, the semi-fluid meat product passes from the storage hopper 4 into a chamber 6 of predetermined dimensions, and from this chamber the meat is periodically discharged through the nozzle by a plunger actuated through a plunger rod 7 and a rock lever 8. The mechanism (not shown) for actuating the rock lever 8 is synchronized with the movement of an endless conveyer 9 which passes directly under the nozzle 5. One end of this conveyer 9 passes around a roller 11 which is actuated through a belt 12 by a motor 13. The conveyer, details of which are shown in Figs. 3 and 5, is adapted to carry a plurality of molding pans 15 which in passing under the nozzle 5 are filled with predetermined accurately measured quantities of the scrapple.

Operatively associated with the hopper discharge mechanism is mechanism for introducing into the pans 15 predetermined small quantities of grease both prior to and after introduction thereto of the scrapple. This mechanism may consist of a container 20 for the grease and spaced discharge nozzles 20a and 20b connected therewith and each having a valve operatively connected with the lever 8 whereby the valves are operated intermittently to permit discharge of grease to the pans in proper timed relation with the various associated moving parts.

Figure 3:
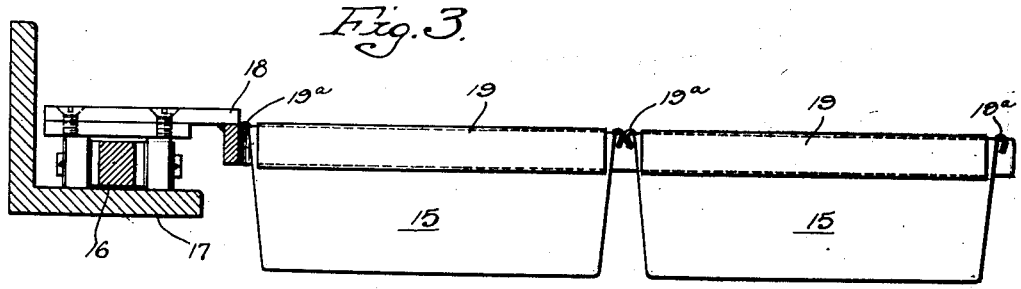
Fig. 3 is a fragmentary sectional view illustrating a detail of the invention.
Figure 5:
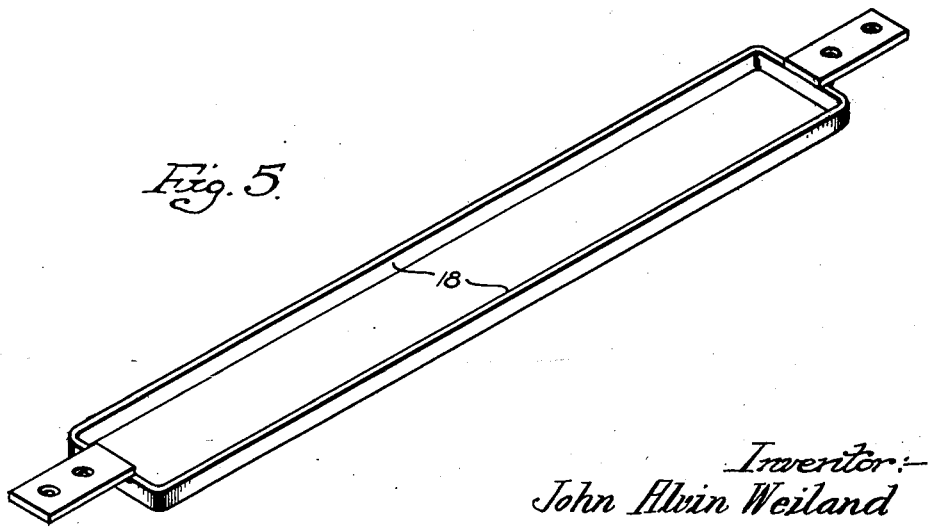
Fig. 5 is a view in perspective of one of the conveyer elements.

As illustrated in the aforesaid Figures 3 and 5, the conveyer comprises a series of connected links 16 which travel on tracks 17 at opposite sides of the conveyer, the two sets of link chains being connected by a plurality of cross bars 18 adapted to receive and support a plurality of pans 15, as illustrated in Fig. 3. The cross bars 18 include spaced longitudinal bars which are respectively embraced by channel members 19 at opposite sides of the pan, as shown in Fig. 4, so that the pans are locked in position in the supports 18. The channel members 19 are constituted by integral turned-over flanges at the upper edges of the pan and may be flexed outwardly to an extent admitting the supporting bars of the conveyer or permitting removal of the molds. Normally, however, the molds are securely interlocked with the conveyer cross bars and in a manner permitting inversion without detachment. The mold pans 15 are also provided at their narrow ends and upper edges with outturned flanges 19a which afford a proper spacing of the molds in end to end relation in the supports. The end flanges 19a with the channel flanges 19 form a gutter extending completely around the pan at the upper edge which gutter is interrupted at each corner of the pan. This gutter intercepts and diverts water or other moisture adhering to the outside of the pan when the latter is inverted and prevents it from coming in contact with the food product or with any part of the apparatus with which the said product comes into contact.

As shown in Fig. 1, the conveyer 9 moving in the direction of the arrow passes into a cooling chamber 14. This chamber comprises an elongated tank 19 for a cooling liquid and a casing 21 surrounding the upper portion of the tank and forming an enclosed space above the liquid in the tank for circulation of air or other cooling fluid. The casing 21 has at each end a tower 22 and 23, the latter being provided with an electrically actuated fan or blower 24 by means of which a circulation of air in the direction of the arrows may be set up through the casing. It will be noted that the air circulates in the opposite direction to the movement of the conveyer through the chamber. In each end of the chamber and in the interior thereof is mounted a roller 25 which engages the top of the conveyer and depresses the intervening portion thereof so that the molds 15 are immersed in the water bath in the tank 19. Suitable means is provided for circulating the cooling liquid through the tank through pipes 26, 26. In this cooling chamber, cooling action is effected through the medium both of a circulating liquid in the tank 19 and air circulated by the fan 24 over and around the tops of the pans.

From the chamber 14, the molds with the scrapple or other product at a materially reduced temperature pass into a refrigerating chamber 27. This chamber comprises a liquid containing tank 28 and also means for circulating over the surface of this liquid refrigerated air. As illustrated, the space above the tank 28 is enclosed by a casing 29, there being within this casing a partition 31 which forms an air channel directly above the surface of the liquid in the tank 28 and a chamber above the partition for cooling coils 32 of a suitable refrigerating system.

At one end of the partition 31 is established an electric fan or blower 33 which sets up a circulation of air in the casing 29, as indicated by the arrows, the air circulating past the coils and around the partition 31. Rollers 34 provide for immersing the pans 15 in the liquid cooling bath, and means is provided for circulating the liquid through the tank 28, this means comprising a pump 35 connected through a pipe 36 with one end of the tank and at the other side with cooling apparatus 37, which in turn is connected through a pipe 38 with the other end of the tank 28. The cooling apparatus 37 consists of a trough 39 through which the water is passed around cooling coils 41, these latter coils being connected in a suitable refrigerating system such, for example, as that used in conjunction with the coils 32. The water, therefore, is continuously and successively circulated through the tank 28 and the cooling or refrigerating apparatus 37. Within the refrigerating apparatus 27, the scrapple or other product within the pans is completely solidified and put in condition for wrapping.

Following movement of the conveyer from the refrigerating chamber 27, the latter traveling over a roller 42 is passed by means of a depressing roller 43 through a water bath in a tank 44, the temperature of this water being just sufficient to effect a melting of the grease around the sides of the pan so that when the conveyer pans are inverted by passing over the terminal roller 45, the contents will slide freely from the pans. Spaced guard rails 46 surround the end of the conveyer where it passes around the roller 45 and prevents complete discharge of the contents until the latter are in a position to be deposited upon an endless conveyer 47, this conveyer operating in the direction of the arrows around rollers 48, 49, 51 and 52. It will be noted that the guard plate 46 at its lower end extends downwardly at a slight inclination to the upper run of the belt 47 so that the contents of the pans 15 are deposited smoothly upon the said conveyer. The grease deposited on top of the scrapple within the pans provides for free slippage of the molded product on the guard 46. A pan 50 located below the lower end of the plate 46 receives all excess grease.

Following discharge of the solidified product from the mold pans, the latter are carried in inverted position over a steam jet 60 or its equivalent which cleans and sterilizes the molds for reception of another quantity of the product from the hopper 4.

The conveyer 47 is provided with a series of outwardly projecting transverse fins 53 which are spaced apart to form what in effect are a series of pockets for the reception of the molded product. These fins 53 support the product where it passes downwardly around the rollers 49 and 51 and in conjunction with a suitable guide member 54 carry the bodies to a point immediately overlying a conveyer 55, upon which the bodies are deposited to be carried to a wrapping machine 56 in which they are wrapped and prepared for distribution.

In some instances it may be desirable and has been found practicable to line the pans or molds prior to the introduction of the scrapple or other product with tin or other metallic foil, leaving a sufficient overhanging flap to cover the top of the molded product, whereby the finished article will be entirely encased and may be preserved over extended periods.

The mechanism herein described, as previously stated, is adapted for the molding and packaging of such products such as scrapple, meat loaves, cornmeal, mush and similar materials having a tendency to congeal or harden into definite form at normal or relatively low temperatures, and provides a means for processing the materials from the cooking stage to and through the wrapping without handling. There may be modification of the apparatus without departure from the invention.

I claim:

1. In apparatus for processing food products, the combination with a chamber adapted to receive the product in a semi-fluid condition, a plurality of molds, means for conducting said molds in proximity to the chamber, mechanism associated with the chamber and operating in timed relation with said mold-conducting means for discharging predetermined quantities of the semi-fluid product from the chamber into the molds, mechanism operative in advance of the said discharge mechanism for introducing into said molds predetermined quantities of grease, cooling apparatus through which the molds are passed and in which the semi-fluid product is chilled to solidity, and means for warming the molds and for immediately thereafter inverting the molds to discharge the solidified contents.

2. Apparatus for processing food products comprising a storage chamber adapted to receive the material in semi-fluid condition, a conveyer passing in proximity to said chamber, molds carried by said conveyer, mechanism operatively associated with the chamber for discharging predetermined quantities of the semi-fluid product into the molds, other mechanism operative to deposit predetermined quantities of grease into said molds both prior and subsequent to the reception of the semi-fluid product, said discharge and depositing mechanism operating in timed relation with each other and with the conveyer, means for cooling the product to solidify it in the molds, and means for discharging the solidified product.

3. In apparatus for processing food products, the combination with a storage chamber adapted to receive the product in a semi-fluid condition, of a conveyer moving in proximity to said chamber, a plurality of molds carried by the conveyer, mechanism operating synchronously with the conveyer to deposit in said molds predetermined quantities of grease, mechanism operatively associated with the said storage chamber and also operating synchronously with the conveyer to discharge the semi-fluid product from the chamber into the molds subsequent to the introduction of said grease, apparatus for cooling the molds to solidify the contents, means for thereafter warming the molds to an extent melting the said grease, and means for immediately thereafter inverting the molds to permit discharge of the solidified contents.

4. In apparatus for processing food products, the combination with a conveyer, of a plurality of molds carried by said conveyer, means for introducing the food product in a semi-fluid condition into said molds, cooling apparatus through which the conveyer moves with said molds to effect solidification of the contents, said apparatus comprising a liquid bath in which the molds are immersed, and means for effecting a circulation of air over the tops of said molds.

5. In apparatus for processing food products, the combination with a conveyer, of a plurality of molds carried by said conveyer, means for introducing the food product in a semi-fluid condition into said molds, cooling apparatus through which the conveyer moves with said molds to effect solidification of the contents, said apparatus comprising a liquid bath in which the molds are immersed, means for effecting a circulation of air over the tops of said molds, and refrigerating means located in the path of said circulating air.

6. In apparatus for processing food products, the combination with a conveyer, of a plurality of molds carried by said conveyer, means for introducing the food product into the molds in a semi-fluid condition, cooling apparatus through which the conveyer carries the said molds to solidify the contents, said cooling apparatus comprising a liquid bath in which the said molds are immersed, means for circulating a cooling fluid over the tops of said molds, and means for refrigerating both the liquid and the said circulating fluid.

7. The method of processing food products, which comprises introducing said product in a warm and semi-fluid condition into a mold, introducing into the mold prior to the introduction of said product a restricted quantity of grease, chilling the mold to effect solidification of the said grease and the food product, warming the mold to melt the grease, and immediately inverting the mold to permit discharge of the solidified contents.

8. In combination with the side rails of a supporting structure, a molding pan for food products having at opposite sides channeled flanges forming pockets of rectangular cross section for reception of the side rails of said supporting structure, the said flanges entirely enclosing said supporting rail and being free at their lower edges and being flexible to permit flexing away from the sides of the pan to removably admit said carrier rails laterally to said pocket.

9. A molding pan for food products having at opposite sides channeled flanges forming pockets of rectangular cross section for reception of the side rails of a supporting structure, the said flanges entirely enclosing said supporting rails and being free at their lower edges and being flexible to permit flexing away from the sides of the pan to removably admit said carrier rails to said pocket, and channels at the other opposite sides of the pan cooperating with the aforementioned channels to prevent moisture from dripping from said pan on said products when discharged from the molds.

10. In apparatus for processing food products, the combination with a conveyor having carrier rails, of a plurality of molds carried by said conveyor, means through which the conveyor moves with said molds to effect solidification of the contents, said means comprising a liquid bath, and means for inverting the molds to discharge the solidified contents therefrom, said molds having channels forming pockets at opposite sides thereof which are open at their inner edges and flexible to removably admit the carrier rails to the pockets.

JOHN ALVIN WEILAND.